United States Patent [19]

Scher et al.

[11] 4,255,480

[45] Mar. 10, 1981

[54] ABRASION-RESISTANT LAMINATE

[75] Inventors: Herbert I. Scher; Israel S. Ungar, both of Randallstown, Md.

[73] Assignee: Nevamar Corporation, Odenton, Md.

[21] Appl. No.: 879,848

[22] Filed: Feb. 22, 1978

Related U.S. Application Data

[63] Continuation-in-part of Ser. No. 758,265, Jan. 10, 1977, abandoned.

[51] Int. Cl.$^3$ .............................................. B32B 5/16
[52] U.S. Cl. ................................... 428/208; 156/222; 156/277; 156/279; 428/164; 428/165; 428/172; 428/309; 428/329
[58] Field of Search ............... 428/172, 156, 167, 168, 428/164, 165, 204, 206, 207, 309, 324, 208; 156/219, 2 TT, 220, 222, 221; 427/180, 197, 262, 267, 280, 285; 162/134, 135, 130, 132, 128, 275; 264/137, 132

[56] References Cited

U.S. PATENT DOCUMENTS

| | | | |
|---|---|---|---|
| 2,060,824 | 11/1936 | Rafton | 162/128 |
| 2,732,325 | 1/1956 | Lindenfelser | 156/220 |
| 2,739,081 | 3/1956 | Wohnsiedler | 428/474 |
| 3,067,077 | 12/1962 | Latella et al. | 156/277 |
| 3,223,579 | 12/1965 | Dorland et al. | 162/225 |
| 3,346,443 | 10/1967 | Elmer | 428/413 |
| 3,373,070 | 3/1968 | Fuerst | 428/452 |
| 3,373,071 | 3/1968 | Fuerst | 428/452 |
| 3,525,664 | 8/1970 | Hale et al. | 156/274 |
| 3,669,727 | 6/1972 | Raymond | 156/313 |
| 3,798,111 | 3/1974 | Lune et al. | 428/328 |
| 3,814,647 | 6/1974 | Scher et al. | 428/357 |
| 3,928,706 | 12/1975 | Gibbons | 428/328 |
| 3,968,291 | 7/1976 | Chevallier | 428/203 |
| 3,975,572 | 8/1976 | Power | 428/452 |
| 4,006,271 | 2/1977 | French et al. | 428/447 |
| 4,024,842 | 6/1977 | Yoshida et al. | 428/447 |

FOREIGN PATENT DOCUMENTS 836522 3/1970 Canada .
130162 3/1978 Fed. Rep. of Germany .

OTHER PUBLICATIONS

Chemical Abstracts, 149425 vol. 83.

*Primary Examiner*—Stanley S. Silverman
*Attorney, Agent, or Firm*—Karl W. Flocks

[57] ABSTRACT

An abrasion-resistant laminate is prepared by providing an ultra thin coating of mineral particles and micro crystalline cellulose on the surface of conventional printed paper, followed by impregnating the paper with a conventional laminating resin, and then using the print paper so obtained in a laminating process without the necessity of using an overlay sheet.

17 Claims, 6 Drawing Figures

ABRASION-RESISTANT LAMINATE

This is a continuation-in-part of parant copending application Ser. No. 758,265, filed Jan. 10, 1977 now abandoned.

FIELD OF INVENTION

The present invention relates to laminates and, more particularly, decorative laminates of high abrasion resistance.

BACKGROUND

High pressure decorative laminates are conventionally produced by stacking and curing under heat and pressure a plurality of layers of paper impregnated with various synthetic thermosetting resins. In normal practice the assembly, from the bottom up, consists of a plurality, e.g. three to eight, core sheets made from phenolic resin impregnated kraft paper, above which lies a pattern or print sheet impregnated with melamine resin; on top of the print sheet is provided an overlay sheet which, in the laminate, is almost transparent and provides protection for the pattern sheet.

The core sheets are conventionally made from kraft paper of about 90–125 pound ream weight. Prior to stacking, the kraft paper is impregnated with a water-alcohol solution of phenol-formaldehyde resole, dried and partially cured in a hot air oven, and finally cut into sheets. The print sheet is a high quality, 50–125 ream weight, pigment filled, alpha cellulose paper that has been impregnated with a water-alcohol solution of melamine-formaldehyde resin, dried and partially cured, and finally cut into sheets. The print sheet, prior to impregnation with the resin, usually has been printed with a decorative design, or with a photogravure reproduction of natural materials, such as wood, marble, leather, etc.

The overlay sheet is almost invariably used when the print or pattern sheet has a surface printing in order to protect the printing from abrasive wear. The overlay sheet is a high quality alpha cellulose paper of about 20–30 pounds ream weight that is also impregnated with melamine-formaldehyde resin in a manner similar to that used for the print sheet, except that a greater amount of resin per unit weight of paper is used. The individual sheets are stacked in the manner indicated above and, if six sheets of impregnated core paper are used, there results a finished laminate having a thickness of about 50 mils, it being understood that a different number of sheets can be used to provide thicker or thinner laminates.

The stack of sheets as described above is placed between polished steel plates and subjected to about 230°–240° F. (e.g. 300° F.) at 800–1600 p.s.i. (e.g. 1000 p.s.i) for a time sufficient to consolidate the laminate and cure the resins (e.g. about twenty-five minutes). This causes the resin in the paper sheets to flow, cure and consolidate the sheets into a unitary laminated mass referred to in the art as a decorative high-pressure laminate. In actual practice, two laminated stacks are pressed back to back, separated by a coated release sheet that allows the two laminates to be peeled apart after separation. Also, a large proportion of the stacks are laminated with an aluminum foil-kraft paper composite sheet inserted between the overlay and the metal plate, with the aluminum facing the overlay, in order to obtain a laminate having a lower gloss and a slightly textured surface which is desirable for some products.

At the completion of the laminating operation, the backs of the laminates are sanded to permit gluing to practicle board, plywood or other substrates. The glued, laminate surfaced panel is then fabricated into furniture, kitchen counter tops, table tops, store fixtures and other end-use applications widely accepted for the combination of appearance, durability and economy.

A number of variations of the above-described general process are known, particularly those operations designed to obtain special effects in appearance and texture. Also other curing cycles are possible and, in fact, sometimes other resin systems are used as well.

Besides decorative high-pressure laminates referred to above, there are also a number of low-pressure products which have been developed in recent years, including low-pressure laminates using either saturated polyester resins, or melamine-formaldehyde resin. One of the fastest growing materials competing with high-pressure laminates in recent years is a product referred to as low-pressure melamine board which is normally pressed in a short cycle at 175–225 p.s.i at 325°–350° F. These low-pressure products have the advantage of being normally less expensive, but they cannot be given the title of "high pressure laminates" because in order to be entitled to that designation, a product must meet a variety of rigid standards promulgated by the National Electric Manufacturers Association, NEMA LD3-1975 which includes standards relating to abrasive wear, stain resistance, heat resistance, impact resistance, dimensional stability, etc. While various other decorative printed, surfacing materials, such as some of the low-pressure laminates, have certain of the desirable characteristics, no products other than high-pressure laminates currently available have all of these properties.

One of these properties in particular which is very important is abrasion resistance. A high-pressure decorative laminate must have sufficient abrasion resistance to permit use in high exposure areas such as dinette surface tops, check-out counters, etc. The standard NEMA test for abrasion resistance is NEMA test LD-3.01. In this test a laminate sample is clamped on a rotating disc, over which ride two weighted rubber wheels, faced with calibrated sand-paper strips. As the laminate surface is rotated under the wheels, the abrasive action of the sand-paper cuts through the surface of the laminate and gradually through the overlay until the printed pattern is exposed and destroyed. The NEMA standard for Class I laminate requires that the laminate, after four hundred rotation cycles, has no more than 50% of its pattern destroyed. The 50% end point is estimated by averaging the number of cycles at which the pattern shows initial wear, and the number of cycles at which the pattern is completely destroyed.

If a high-pressure decorative laminate is prepared in a conventional manner, with a normal 35–40% resin content in the print or pattern sheet, but without an overlay sheet, the abrasion resistance will be only about 50–75 cycles. If specially formulated melamine resins are used in the pattern sheet with a resin content of 50–55%, abrasion resistance of up to about 150–200 cycles are on occasion obtainable without an overlay sheet, but in this latter case the laminates have a tendency to develop surface craze and, furthermore, they are quite difficult to prepare due to the difficulty of impregnating the print sheet in a uniform manner; additionally, they do not meet the 400 cycle minimum required by the NEMA standard.

Nevertheless, it is desirable to produce a laminate without an overlay sheet which is capable of attaining the performance characteristics of a laminate using an overlay, and, in particular, one that provides a 400 cycle abrasion resistance. Furthermore, it is desirable to provide a laminate which, in addition to having the 400 cycle abrasion resistance, has an initial wear point at least equal to the initial wear point of a conventional high-pressure laminate having overlay, typically 175–200 cycles. This is desirable because in actual use the laminate appearance becomes unsatisfactory not when 50% of the pattern is destroyed, but when a much lower percentage is destroyed. It is well known from many years of field experience that conventional laminates with overlay, which have 175–200 cycle initial wear point, when used in hard use areas, will have a satisfactory appearance, at least as long as the normal replacement cycle, it being understood that replacement of most laminates in commercial uses is made for style reasons rather than because of pattern wear. Therefore, a laminate without overlay should meet these same criteria, namely it should have both a NEMA abrasion resistance of at least 400 cycles and an initial wear point in the same test for at least 175–200 cycles, even though the latter requirement is not part of the NEMA standard.

It is desirable to be able to provide these characteristics, but without using an overlay, for several reasons:

1. Overlay adds substantial raw material costs to the manufacture of laminates, both the cost of the overlay paper itself, the cost of the resin used to impregnate the overlay paper and the in-process and handling of losses of these materials.

2. The overlay, by imposing an intermediate layer of substantial thickness between the print sheet and the eyes of the viewer, detracts significantly from the desired visual clarity of the pattern. The cellulose fibers used to make overlay paper have a refractive index close to that of cured melamine-formaldehyde resin. The fibers are therefore almost invisible in the cured laminate, and permit the printed pattern to be seen with very little attenuation. However, modern printing techniques are making available very accurate reproductions of natural materials, particularly various wood veneer species. As these printed reproductions approach in appearance the natural veneer, even small amounts of haze or blur introduced by the overlay paper are disturbing visually and destroy much of the realism desired by the user.

3. Furthermore, the overlay contributes to the rejection rate of the laminate products produced. The impregnated, dry overlay sheet tends to attract small dirt particles because it develops static electricity charges during drying. This dirt is hard to detect and remove before laminating, and results in spoiled laminate sheets that cannot be reprocessed. In addition, the impregnated dried overlay is brittle and hard to handle without breakage. Broken pieces are accidentally trapped on the surface of the overlay and also result in visually defective sheets.

Additionally, overlay containing laminate, particularly those having a relatively high surface gloss, have a tendency to become dull very quickly when subjected even to only moderate abrasive wear. This is understandably unacceptable where glossy laminates are desired.

The problem of providing improved abrasion resistance has been a long standing problem in the field. Many solutions to the problem have been suggested and, in fact, some of these have reached commercial development. Nevertheless, it has not heretofore been possible to provide a laminate, not having an overlay sheet, but having a NEMA abrasion resistance of at least 400 cycles and an initial wear point in the same test of at least 175–200 cycles.

It is well known that small, hard mineral particles dispersed in overlay paper, or in resin mixtures to coat the impregnated pattern sheet, can enhance the abrasion resistance of high-pressure laminates (see, for example, the patterns to Michl, U.S. Pat. No. 3,135,643; Fuerst U.S. Pat. No. 3,373,071 and Fuerst U.S. Pat. No. 3,373,070). Techniques such as these do not eliminate the overlay, but either enhance its abrasion resistance, or provide an alternate form of overlay and associated resin.

For example in the Baran U.S. Pat. No. 3,123,515, the overlay sheet is impregnated with a finely divided frit, the impregnated sheet containing between 20 and 60% by weight of resin and frit in which the proportion of frit is between about 35 and 60% of the total solids added. The overlay is used in the normal manner by placing it over the print or pattern sheet.

In the Fuerst U.S. Pat. No. 3,373,070, a process is disclosed whereby silica is incorporated into the overlay structure during the manufacture of the overlay paper itself, thereby providing a uniform distribution of the silica throughout the overlay sheet. This patent includes a discussion near the bottom of column 1 of the disadvantages of the Barna type procedure of impregnating the overlay, Fuerst being of the opinion that a silica rich resinous coating on the top of the overlay is undesirable.

The Michl U.S. Pat. No. 3,135,642 in essence shows the casting of, or in the situ manufacture of, an overlay sheet over the print sheet. The coating includes silica, finely divided cellulose flock, carboxy methyl cellulose and melamine resin solids. The weight of the dry coating is said to be 0.022 to 0.033 pounds per square foot of print sheet on the dry basis. This weight is equivalent to 66–99 pounds per ream, corresponding almost exactly to the weight of a conventional impregnated overlay paper, and has a thickness of about 2.5 mils (see Table D of Michl). At best the Michl procedure provides only a minor raw material cost advantage compared with the use of conventional overlay, and does not solve the problem of impaired visual effects due to haze or blur.

The Fuerst U.S. Pat. No. 3,373,071 is very similar to the Michl patent, except that the overlay cast in situ over the print sheet contains micro crystalline cellulose. This coating is said to be applied, on a dry weight basis, of 0.022 to 0.33 pounds per square foot, again giving a thick coating which weighs at least 66 pounds per ream, the same weight as the conventional impregnated overlay paper.

One interesting technique which was unsuccessfully tried is that disclosed in the Lane et al U.S. Pat. No. 3,798,111 in which there is disclosed the use of small mineral particles, preferably alumina, which are incorporated within and near the upper layer of the base paper during its manufacture. Thus, the abrasive-resistant particles are incorporated in the paper during the paper-making process as in Fuerst U.S. Pat. No. 3,373,070, but, more analogously to Barna, they are incorporated after the base layer of paper has been formed and is still in a wet state supported on the forming wire. After its manufacture, this paper is subsequently printed, impregnated and then used in the laminating operation as the print sheet without the necessity of using an overlay. In this process, the printing occurs above or on top of the hard mineral particles and, consequently, high-pressure laminates produced using a print sheet made in accordance with the Lane patent, and without an overlay, have unacceptably low initial wear, even though they do not have a NEMA abrasion resistance of at least 400 cycles. In tests, it has been shown that laminates made with the print paper of Lane et al, without overlay, had initial wear values of under 100 cycles, some as low as 35 cycles. Furthermore in a rubbing test to determine initial wear, such laminates began to show pattern destruction after only 3,000 rub cycles, far less than necesary.

Other prior art patents of some interest with regard to the background of the present invention are the patents to Fuerst U.S. Pat. No. 3,445,327; Gibbons U.S. Pat. No. 3,928,706 which suggests the use of a cast in situ overlay used together with a conventional overlay, and Merriam U.S. Pat. No. 3,661,673. Of somewhat less interest are the Battista U.S. Pat. Nos. 3,259,537 and 3,157,518; Ando et al U.S. Pat. No. 3,716,440; Power et al U.S. Pat. No. 3,946,137 and Boenig U.S. Pat. No. 3,318,760.

Even after the considerable activity in the field in order to solve the problems indicated above, these problems have not been solved until the present invention.

SUMMARY

It is, accordingly, an object of the present invention to overcome the deficiencies of the prior art, such as indicated above.

It is another object of the present invention to provide for an improved decorative laminate.

Another object of the invention is to provide a high-pressure decorative laminate that does not contain an overlay sheet, but which nevertheless meets the requirements of the NEMA abrasion standard, and furthermore provides an initial wear point of at least 175–200 cycles in this same test.

It is yet another object of the present invention to provide such a high-pressure laminate using conventional base papers used for the printing of the pattern or point sheet.

It is still a further object of the present invention to provide a process whereby the printed pattern sheet is impregnated utilizing conventional impregnation and drying equipment commonly used in the laminating field.

It is a further object of the present invention to provide for improved decorative laminates in a manner which does not require substantial raw material costs and which significantly enhance the economics of laminate production by the elmination of the overlay sheet.

Another object of the present invention is to provide a process for making laminates which involves significant cost reduction and results in a product having improved appearance and which has the potential for previously unavailable additional novel graphics development.

Another object of the present invention is to provide for improved low-pressure laminates including the upgrading of low-pressure melamine board.

These and other objects of the invention are attained by coating conventional printed or otherwise decorated pattern paper with an ultra thin coating containing small mineral particles immobilized in place on the paper sheet by a suitable binder, and wherein such print sheet is then impregnated in the normal manner with a suitable thermosetting resin such as melamine resin, and then using the print sheet in the production of decorative laminates without an overlay sheet.

BRIEF DESCRIPTION OF THE DRAWINGS

The above and other objects in the nature and advantages of the instant invention will be more apparent from the following detailed description of embodiments taken in conjunction with the drawing wherein.

DETAILED DESCRIPTION OF EMBODIMENTS

There has now been discovered a novel composition, containing small mineral particles, which when coated without resin over unimpregnated printed pattern paper, provides surprising and unexpected properties by permitting such paper to be used in the preparation of decorative laminates without an overlay sheet and wherein the resultant laminates are highly abrasion resistant. In its preferred form, the coating composition is composed of a mixture of small particles of alumina or other abrasion resistant particles of average 20–50 micron particle size, and a lesser amount of micro-crystalline cellulose particles, both dispersed in a stable, aqueous slurry. The particles of alumina, of small size such that they do not interfere with the visual effects in the final product, serve as the abrasion resistant material and the microcrystalline cellulose particles serve as the preferred temporary binder. It will be understood that the binder must be compatible with the resin system later utilized in the laminating procedure, usually a melamine resin or in the case of certain low-pressure laminates a polyester resin system, and the micro-crystalline cellulose serves this function as well as stabilizing the small particles of alunina on the surface of the print sheet.

Figure 4:
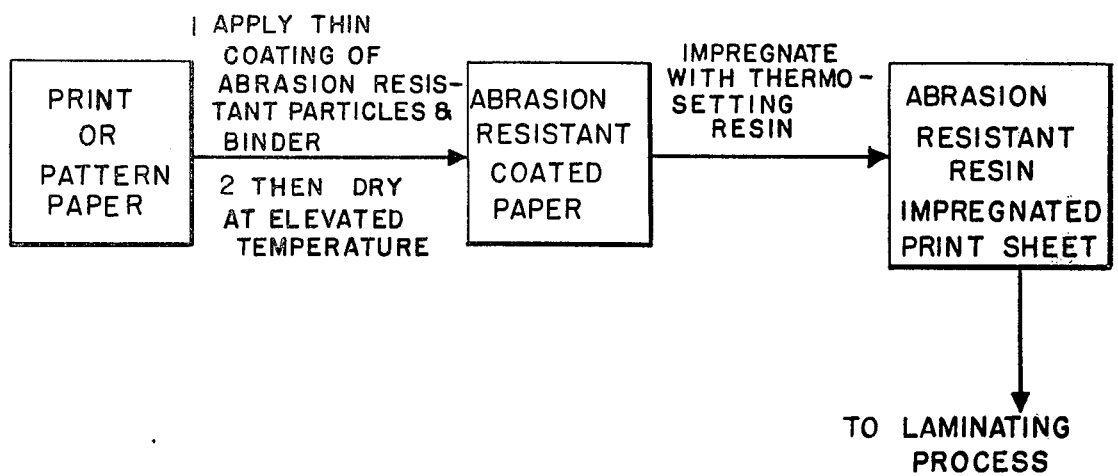
FIG. 4 is a flow-diagram showing a method of preparing a print layer in accordance with the present invention.
Figure 5:
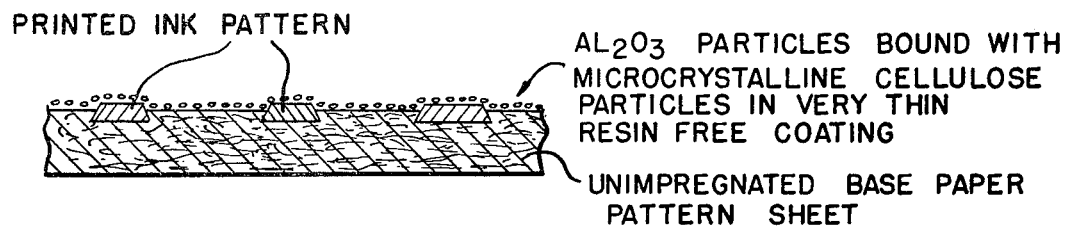
FIG. 5 is a schematic sectional view showing an embodiment of the print sheet in accordance with the present invention.

With reference to FIG. 4, in the preferred operation a conventional unimpregnated print or pattern paper is coated with the mixture of hard mineral particles and binder, preferably alumina and micro-crystalline cellulose particles in a stable aqueous slurry normally at a rate of about 1–10 lbs. per ream, and the coating is dried at an elevated temperature of at least 140° F. and preferably 180° F., such as in a hot-air oven, to produce a thin coating only 0.02 to 0.3 mils thick, preferably no greater than 0.2 mils thick. The resultant abrasion resistant coated paper (FIG. 5) is then impregnated with the melamine or polyester resin and dried in a conventional way, at which point it is ready for the laminating procedure. Based on the comparative weights of the print sheet and the micro-crystalline cellulose in the ultra-thin coating thereon, and the total amount of melamine resin impregnated thereinto, it is calculated that only 0.1–3.0 parts of micro-crystalline cellulose are used per 100 parts of resin.

Figure 6:
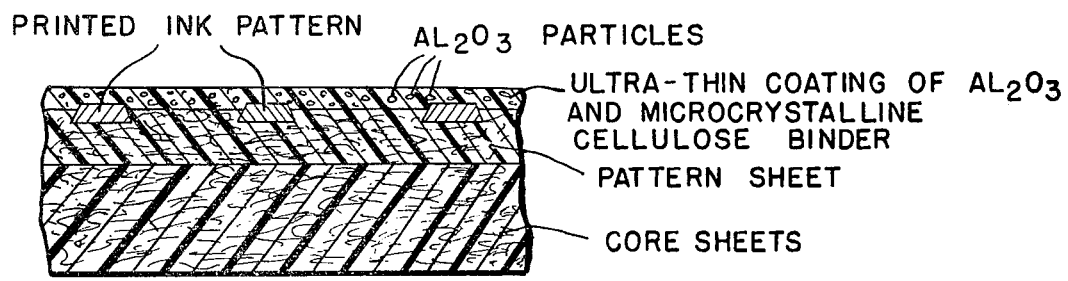
FIG. 6 is a schematic sectional view showing a laminate in accordance with the present invention.

With reference to FIG. 6, it is seen that the abrasion resistant resin impregnated print sheet, having an ultra-thin abrasive resistant coating on its upper surface, is assembled for the laminating step in the conventional way, except that no overlay sheet is used. The laminate is then cured under heat and pressure in the conventional manner. A surprising characteristic of the ultra-thin coating is that even though it is so thin, it can provide abrasion resistance in the finished laminate not only meeting 400 cycles NEMA Standard, but also providing an initial wear point in excess of 175–200 cycles.

It is also surprising that this coating tightly adheres to the surface of the printed paper when the paper is later impregnated with melamine resin, without significant amounts of the mineral particles either being lost in the impregnating solution or migrating away from the surface of the paper. A further surprising characteristic of this coating is that it does not appear to hinder the penetration of the melamine-formaldehyde resin solution into the interior of the paper, during the impregnation step. Such penetration is essential, or the pattern sheet will be irregularly starved such as at its center, and could possibly delaminate after pressing. A further desirable characteristic of the coating is that it does not significantly scatter or attenuate light, resulting in very clear, crisp appearance of the pattern in the finished laminate.

Without being bound to the following theory, it is believed that the improved characteristics of the invention can be accounted for as follows. Microcrystalline cellulose particles contain very large external forces that bind to other polar substances, such as cellulose and alumina. Thus, an aqueous slurry of microcrystalline cellulose and alumina is stable and does not quickly settle out, even though alumina particles in water are not stable. Furthermore, when this slurry is coated on the paper, the micro crystalline cellulose apparently binds the alumina particles to the surface fibers of the paper, and to the top of the ink pattern, preventing migration of the alumina particles to below the surface. This may account for the good abrasion resistance developed by such small quantities of alumina. Thus, all or substantially all of the alumina particles stay at the surface where they do the most good, rather than becoming dispersed below the surface where they would contribute relatively little initial wear resistance.

As indicated above, the preferred slurry composition contains a mixture of small particles of alumina and a lesser amount of microcrystalline cellulose particles, both dispersed in water. There must be an amount sufficient of the small mineral particles to provide the resultant product with the desired abrasion resistance as discussed above, and there must be an amount sufficient of the binder to retain the mineral particles in place on the surface of the print sheet. In general, it has been found that satisfactory results are attained with about 5 to 10 parts by weight of the microcrystalline cellulose for about 20–120 parts by weight of the alumina; it is possible to work outside this range but there is no advantage doing so and, furthermore, the handling problems become complicated. The quantity of water in the slurry is also dictated by practical considerations, since if there is too little water the slurry becomes so thick that it is hard to apply; similarly, if there is too much water the slurry becomes so thin that it is difficult to maintain a consistent thickness during the coating operation due to running of the slurry. Thus, a slurry containing about 2.0 wt % microcrystalline cellulose and about 24 wt % alumina, based on the water, is stable, i.e. the alumina does not settle out; but if more than about 3.5 wt % microcrystalline cellulose and about 24 wt % alumina, based on the water, is used, the slurry becomes very thixotropic and difficult to apply.

The composition also preferably contains a small amount of wetting agent, preferably a non-ionic wetting agent, and a silane. The quantity of wetting agent is not critical, but only a very small amount is desirable and excess quantities provide no advantage. If a silane is used, it acts as a coupling agent* which chemically binds the alumina or other inorganic particles to the malamine matrix after impregnation and cure, and this provides better initial wear since the alumina particles are chemically bound to the melamine in addition to being mechanically bound thereto and therefore stay in place longer under abrasive wear. The silane should be selected from among the group making it compatible with the particular thermosetting laminating resin used; in this regard silanes having an amino group, such as gamma-aminopropyl trimethoxy silane, are particularly effective for use with melamine resins. The quantity of silane used need not be great and, in fact, as little as 0.5% based on the weight of the alumina is effective to enchance the abrasion resistance of the final laminate; a maximum quantity of about 2% by weight based on the weight of the alumina or other hard particles is suggested since greater quantities do not lead to any significantly better results and merely increase the cost of the raw materials.

*Silanes as coupling agents in other arts are known, e.g. in the manufacture of fiberglass tires, grinding wheels and fiberglass reinforced polyester bodies. See the 1976–77 Edition of Modern Plastics Encyclopedia, Page 160, which lists some silanes useful with melamine and polyester systems.

It is an important feature of the present invention that the coating using micro-crystalline cellulose as the binder must be dried at an elevated temperature before the print sheet is impregnated with the melamine resin. Thus, a minimum drying temperature is about 140° F. and the preferred drying temperatures are from 240°–270° F.

With regard to the abrasion resistant mineral particles, alumina is the preferred material. Silica, which has been suggested in certain prior art patents as an abrasion resistant material, provides considerably inferior results in the present invention compared with alumina. Other minerals of sufficient hardness such as zirconium oxide, cerium oxide, diamond dust, etc. can work, but are either too expensive for practical usage or under certain circumstances produce excessive color shift. Glass beads have been tried unsuccessfully. Silicon carbide also was tried, and while providing good abrasion resistance, produced excessive color shift. Mixtures of silica and alumina give good results, and in some environments, such as where wear of cutting tools is a significant factor, silica may be the preferred particles.

An important feature is the size of the alumina or other hard particles. Beneath 20 micron particle size, abrasion resistance becomes poor, and the preferred minimum average particle size is about 25 microns. Maximum average particle size is limited by surface roughness in the article and interference with visual effects. The preferred maximum average size of the abrasive resistant particles is about 50 microns.

The nature of the binder for the mineral particles is a very important feature in the present invention. Of all the materials tried, microcrystalline cellulose is by far the most satisfactory material. The binder must serve not only to maintain the mineral particles in position on the surface of the print sheet, but should also act as a suspending agent in the slurry (otherwise, it would be necessary to add an additional suspending agent). The peculiar property of microcrystalline cellulose is that it acts like a typical suspending binding agent and film former, but unlike other agents is not water soluble before or after suspension and forms a highly porous film through which the thermosetting resin can penetrate. In addition, the binder must be compatible with the laminating resin and microcrystalline cellulose is compatible with both melamine resin and polyester resins. Furthermore, it must not scatter or attenuate light in the thicknesses applied in the final laminate, and microcrystalline cellulose is satisfactory in this regard as well.

Other binders which may be used, but which provide inferior results compared with microcrystalline cellulose, are various typical suspending-binding agents including anionic acrylic polymer, carboxy methylcellulose and similar materials such as hydroxypropyl cellulose, methylcellulose, polyvinyl alcohol, polyvinyl pyrrolidone, etc. However, as indicated above, microcrystalline cellulose is by far the preferred binder.

Microcrystalline cellulose is a non-fibrous form of cellulose in which the cell walls of cellulose fibers have been broken into fragments ranging in length from a few microns to a few tenths of a micron. It is not a chemical derivative but a purified alpha cellulose. Microcrystalline cellulose is available under the trademark "AVICEL", the preparation of which is disclosed in the Battista U.S. Pat. No. 3,275,580. AVICEL Type RC 581 is a white, odorless hygroscropic powder. It is water dispersible and contains about 11% sodium carboxymethyl cellulose as a protective colloid. Its particle size is less than 0.1% on a 60 mesh screen.

Features and advantages of the instant invention which are considered to be particularly significant are as follows:

(1) The mixture of mineral particles and microcrystalline cellulose is deposited from a water slurry, rather than used as fillers in a resin solution. The abrasion-resistant mineral particles are thereby highly concentrated in the resultant layer.

(2) Such slurry is coated on an unimpregnated printed pattern sheet, rather than on an impregnated pattern sheet.

(3) The coating is dried at an elevated temperature of at least about 140° F.

(4) The coating thickness is 0.02–0.3, preferably 0.02–0.2 mils, rather than 1–2 mils.

(5) After applying the coating and drying it, the pattern sheet is then impregnated with the thermosetting resin, and this conventional impregnation of the pattern sheet is carried out on conventional equipment, rather than special, difficult to control, coating of a thick slurry.

(6) The ultra-thin layer provides unexpectedly high abrasion resistance.

The desirable characteristics of the alumina particle binding agent, which characteristics are all met by microcrystalline cellulose, are: It acts as a film former; it acts as a binding agent for the mineral particles; it acts as a suspending agent in the slurry for the mineral particles; it is not washed off during the subsequent thermosetting resin impregnating process; it is compatible with the subsequently applied thermosetting resin, such as melamine resin or polyester resin; it it permeable to the thermosetting impregnating resin (indeed microcrystalline cellulose forms a porous film); it is resistant to the heat generated during the laminating procedure; and it does not scatter or attenuate light in the laminate.

The following examples are offered illustratively:

EXAMPLE I

A slurry of the ingredients was prepared in a Waring blender. Microcrystalline cellulose (AVICEL RC 581) was added to stirred water. After 2 to 3 minutes in the blender, the AVICEL was completely dispersed and the aluminium oxide (Microgrit WCA) was gently stirred in. At the end, three drops of TRITON X-100 (a non-ionic detergent) was added to promote wetting.

The resultant slurry was applied as a coating to a 65 lb/ream (3000 ft$^2$) unimpregnated pattern sheet having a woodgrain surface print. The coating was dried at 265° F. for 3 minutes. The paper was then saturated in the normal way using melamine formaldehyde resin and was dried in accordance with normal procedures. The resin content was 45–48% and the volatile content was 5–6%. The laminate was made up and pressed using a conventional general purpose cycle, viz. about 300° F., 1000 p.s.i., for about 25 minutes.

Formulations and abrasion results are listed below for a nominal 1.5 mil wet coating which calculates to a 0.11 mil thick dry coat for Trials 3, 4 and 5, and 0.17 mil thick for Trials 6 and 7.

TABLE 1

|  | 1 | 2 | 3 | 4 | 5 | 5 | 7 |
|---|---|---|---|---|---|---|---|
| Water (ml) | — | 250 | 250 | 250 | 250 | 250 | 250 |
| AVICEL RC 581 (quantity in gms) | — | 6.5 | 7.5 | 7.5 | 7.5 | 7.5 | 7.5 |
| MICROGRIT WCA (quantity in gms) | — | — | 30 | 30 | 30 | 60 | 60 |
| MICROGRIT WCA (particle size in microns) | — | — | 20 | 30 | 40 | 9 | 30 |
| Abrasion cycles, Initial Wear | 25 | 40 | 100 | 400 | 475 | 75 | >500 |
| Pattern Destruction, %, at 500 cycles | 100% | 100% | 20% | 5% | 2% | 95% | 0% |
| Coating rate in lbs/ream* | — | — | 5 | 5 | 5 | 9 | 9 |

*In all examples coating weight in pounds/ream is dry coat weight.

In the above Table, MICROGRIT WCA is aluminium oxide lapping powder manufactured by Micro Abrasives Corporation of Westfield, Massachusetts.

From the above comparative trials, it is seen that the microcrystalline cellulose by itself was not satisfactory (trial 2); and that the use of alumina having a particle size less than 20 microns did not give good results (trial 6). It is seen that MICROGRIT alumina above 20 micron average particle size provided both satisfactory initial wear, and NEMA wear resistance. In addition, the resulting laminates had clearer pattern appearance than conventional laminates having overlay sheets, and such laminates also passed the other NEMA durability tests.

EXAMPLE II

Figure 2:
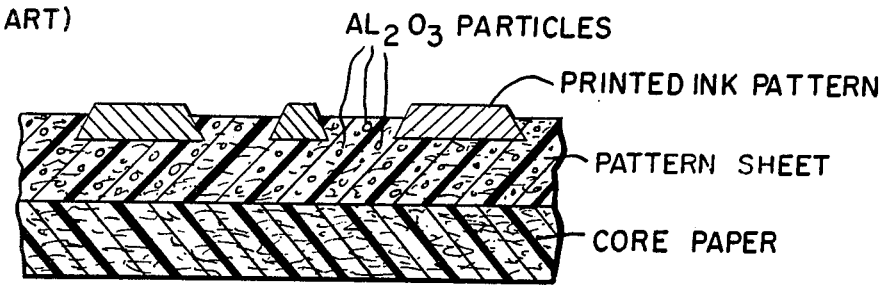

Four slurries were prepared as in Example I, trial #3. Each was used to coat 3 mils wet at 9.4 lbs/ream onto 65 lb. unimpregnated paper, and dried as in Example I to provide a dry coating thickness of approximately 0.2 mil. The dried paper was impregnated with melamine resin and assembled in a laminate stack as shown in FIG. 2. Lamination was carried out as described in Example I. The only variation in the four trials was the average particle size of the alumina. Results were as follows:

TABLE 2

| MICROGRIT Average Particle Size | Pattern Destruction at 500 cycles |
| --- | --- |
| 40μ | 1% |
| 30μ | >5% |
| 20μ | 20% |
| 9μ | 70% |

EXAMPLE III

Example II was repeated in three trials, in each case using alumina particles having an average particle size of 40 microns. The only variation was in the wet coating thickness. Laminates were compared as in Example II. The results were:

TABLE 3

| Lbs/Ream | Wet Coating Thickness | Pattern Destruction at 500 cycles |
| --- | --- | --- |
| 9.4 | 3 mils (0.2 mil dry) | 1% |
| 5.8 | 2 mils (.13 mil dry) | 10% |
| 3.6 | 1 mil (.08 mil dry) | 30% |

EXAMPLE IV

The procedure of Example I was repeated using as a coating slurry for the print sheet the following composition:
250 ml. water;
7.5 gms microcrystalline cellulose;
60 gms of alumina of average particle size 40 microns; and
1 drop of TRITON X-100.
Two trials were carried out providing wet thicknesses of 1 mil (7.4 lbs/ream) and 2 mils (10.5 lbs/ream), respectively. After lamination, abrasion testing produced no initial pattern destruction at 500 cycles.

EXAMPLE V

The procedure of Example IV was repeated using the same coating composition, except that 120 gms of alumina having an average particle size of 30 microns was used. Three trials were run with wet coatings of ½, 1 and 1.5 mils, respectively. Coating rates were 11, 15 and 18 lbs/ream, respectively. Abrasion resistance of the final laminate after 500 cycles gave the following results:

TABLE 4

| ½ mil (.2 mil dry) | 10% pattern destruction |
| --- | --- |
| 1 mil (.27 mil dry) | >1% pattern destruction |
| 1.5 mil (.33 mil dry) | >1% pattern destruction |

The three laminates were highly satisfactory in all other respects. Machineability was good with no chipping.

The physical properties of the third sample (prepared with 0.1 mil coated paper) tested in accordance with NEMA Standard LD3-1975, after impregnation and pressing, were as follows:

TABLE 5

| Wear resistance | >500 cycles |
| --- | --- |
| Stain resistance | No effect |
| Moisture absorption | 6.5% |
| Center Swell | 8.9% |
| Impact (unsupported) | 36" |
| Radiant Heat (unsupported) | 185 seconds |
| Hot Water | No effect |
| Hot Wax | No effect |
| Dimensional stability | M.D. 0.24% |
|  | C.D. 0.56% |

These are all satisfactory or superior values.

EXAMPLE VI

Example IV was repeated in two trials using the same composition, except that in the first trial 60 gms of MICROGRIT SIC 400 (27 micron silicon carbide) was substituted for the alumina and in the second trial 60 gms of MICROGRIT SIC 1000 (10 micron silicon carbide) was substituted for the alumina. For each composition, coatings were deposited at ½, 1 and 1.5 mils wet. The print sheet had a generally "gray" color due to the color of the silicon carbide. Results were as follows:

TABLE 6

| | % Pattern Destruction at 500 Cycles | |
| --- | --- | --- |
| Coating | SIC 400 | SIC 1000 |
| ½ (.1 mil dry) | 20 | 85 |
| 1 (.14 mil dry) | 5 | 80 |
| 1.5 (.17 mil dry) | <5 | 70 |

As can be seen, while abrasion resistance was satisfactory, the 10 micron silicon carbide gave poorer results than the 27 micron silicon carbide. The poor color can be tolerated in only certain colors of print paper.

EXAMPLE VII

Example IV was again repeated with three compositions, this time substituting 60 gms of glass spheres (−325 screen size), 240 gms of such glass spheres and 60 gms of CABOSIL L-5 (silica aerosil of millimicron particle size), respectively, in place of the alumina particles. Each composition was coated at ½, 1 and 1.5 mils wet, at coatings up to 20 lbs/ream.

The results for the heaviest coating weights were as follows:

TABLE 7

| Type | Fully Worn on Taber |
| --- | --- |
| 60g glass | 200 cycles |
| 240g glass | 200 cycles |
| 60g Silica Aerosil | <100 cycles |

None of these samples gave satisfactory abrasion resistance.

EXAMPLE VIII

The procedure of Example IV was again repeated except that this time the coating composition was modified in one sample by the substitution of 6 gms of an anionic acrylic polymer (RETENE 420 from Hercules) in place of the microcrystalline cellulose, and in a second sample by 9 gms of carboxy methyl cellulose in place of the microcrystalline cellulose. For both samples, the Taber abrasion test showed about 5% wear at 500 cycles, a satisfactory performance. However, the anionic acrylic polymer milked the laminate slightly, indicating that the use of this material would be satisfactory for only certain colors. The laminate in which carboxyl methyl cellulose had been used as the binding agent for the alumina had a poor boiling water resistance and could not meet the NEMA Standard in this regard; this material could only be used on certain lower grade low pressure laminates.

EXAMPLE IX

In order to investigate the effects of silanes, the following procedure was carried out. One gram of gamma-amino propyltrimethoxy silane was mixed with a 10% water-90% methanol solution until dispersed; a minimum quantity of liquid is used sufficient to wet the alumina powder. This dispersion was then added to 100 gms of alumina of 30 micron size (MICROGRIT WCA 30) and the alumina was mixed with the solution until thoroughly wetted. The alumina was then dried. Example IV was repeated except that the coating was applied to the print sheet in a ¼ mil thick wet coating at 5.0 pounds per ream (0.1 mils dried). The resultant laminate was compared to laminates prepared in accordance with Example IV (without the silane) also applied at a thickness of ¼ mil wet. All laminates were pressed to a mirror finish. The results of the abrasion resistant tests are set forth in Table 8 below:

TABLE 8

|  | No Silane | Silane |
|---|---|---|
| Initial Wear (cycles) | 300 | 525 |
| Final Wear (cycles) | 1075 | 1250 |
| Wear Value | 687 | 887 |

It is seen from the above results that the silane improved the efficiency of the abrasion resistant coating.

EXAMPLE X

The present invention was tested to determine its efficacy in upgrading the performance of low pressure board. A slurry was prepared as in Example I with 250 gms water, 6.5 gms of microcrystalline cellulose, 30 gms of alumina of 30 micron size and 2 drops of TRITON X-100. The slurry was coated in a ½ mil wet layer at 2.5 lbs/ream (0.5 mil dry) onto unimpregnated printed pattern paper, and dried for 3 minutes at 260° F. The sheet was then impregnated and dried twice to ensure complete impregnation. The impregnated sheet was then placed over a wood particle panel and was pressed at 200 p.s.i. at 300° F. for 6 minutes. As a comparison, an otherwise identical low pressure laminate was made without providing the abrasion resistant coating on the top surface of the print sheet. Both samples were subjected to the NEMA Abrasion Test and the results were as follows:

TABLE 9

|  | Abrasion Resistant Coating | No Coating |
|---|---|---|
| Initial Wear | 200 cycles | nil |
| NEMA Abrasion | 1050 cycles | 150–200 cycles |

From the above tests as tabulated in Table 9, it is seen that the present invention vastly improves the abrasion resistance of low pressure laminates as well.

EXAMPLE XI

The procedure of Example IX was repeated and the coatings were applied at 9 lbs/ream to a thickness of 1½ mils wet (0.17 mil dry). Four trials were run with the quantity of silane being varied, and the resultant laminate subjected to the NEMA Abrasion Test. The initial wear was recorded, results being given in Table 10 below.

TABLE 10

| Quantity of Silane-gms/100 gms alumina | Initial Wear, Cycles |
|---|---|
| 0 | 175 |
| 2 | 475 |
| 3 | 510 |
| 6 | 400 |

The above tests show the effect of the silane is not substantially enhanced after reaching a quantity of about 2 wt.% based on the weight of the alumina; and, in fact, in this particular test at 6% silane, the results were poorer than at 2%, although significantly better than the layer containing no silane at all.

EXAMPLE XII

The procedure of Example IX was repeated to determine initial wear resistance of the final laminate as a function of the temperature used to dry the coating applied over the print sheet. Thus, the pattern sheet was coated with the coating composition of Example IV at a rate of 8–10 pounds per ream (0.2 mils dry), except that the coating composition contained silane in accordance with Example IX. The coating was dried for 3 minutes in each sample at the various temperatures given in table 11 below. After drying the coated sheets were allowed to come to moisture equilibrium with room air at 50% relative humidity at 70° F.; the sheets were then impregnated as usual with melamine formaldehyde resin, and were then laminated in the usual way against a satin finished plate. The results were as follows:

TABLE 11

| OVEN TEMPERATURE, °F. | INITIAL WEAR, cycles |
|---|---|
| 160 | 225 |
| 180 | 550 |
| 200 | 550 |
| 240 | 575 |
| 265 | 575 |

EXAMPLE XIII

A slurry of ingredients was prepared as disclosed in Example I using 6.5 parts by weight of AVICEL microcrystalline cellulose, 2 parts by weight of carboxymethyl cellulose, 30 parts of 30-micron alumina, and 250 parts by weight of water. A trace quantity of TRITON X-100 was added.

The resultant slurry was applied to print sheet using a Meyer rod coating machine at the rate of 5.0 pounds per ream (0.11 mil dry thickness). The print paper was then impregnated with melamine formaldehyde resin to provide a resin content of 41.7%, and drying was effected to provide a volatile content of 4.2%. A laminate was then pressed with the coated print paper using a standard laminating cycle and a mirror-finished laminating plate so that the final laminate had a gloss surface.

The laminate so produced was compared with another mirror-finished laminate made in a conventional way using a 20-pound overlay, both laminates being subjected to the "sliding can test", described infra. The laminate in accordance with the present invention had an initial wear of 325 cycles and a NEMA wear value of 1021 cycles. In the sliding can rub test, the comparative results were as follows:

TABLE 12

| | SURFACE DULLING | |
|---|---|---|
| CYCLES | Conventional Overlay Laminate | Laminate Made with Coated Print Sheet |
| 1500 | slight | no effect |
| 3000 | slight | no effect |
| 6000 | (gradually worse) | no effect |
| 12000 | | slight |
| 18000 | | |
| 24000 | extreme wear | slight wear |

Pattern destruction began at about 30,000 cycles on both samples, but it is seen that the conventional laminate shows gradual surface dulling even at only 1500 rub cycles and, in fact, gradual surface dulling began almost with the first few hundred rub cycles. Furthermore, the conventional laminate is completely dulled well before initial pattern destruction (30,000 rub cycles).

EXAMPLE XIV

An aqueous slurry of ingredients was prepared as in Example I using the following formula:
300 ml. water
11.2 gms AVICEL RC 581
5.4 gms CMC 7L
125 gms silica crystals having maximum particle size 45 microns
2.5 gms Silane 1100

This slurry was coated at 12.1 lbs/ream, the print sheet was then dried, impregnated with melamine resin and finally laminated to phenolic impregnated core sheets. The resultant laminate had the following wear properties:
Initial wear: 225 cycles
Final wear: 950 cycles
Wear value: 587 cycles These results are far superior to both bare print sheet, i.e. without overlay, and the use of silica aerogel, i.e. millimicron size (Example VII) which are worn out in less than 100 cycles.

EXAMPLE XV

Example XIV was repeated with part of the silica replaced with 30 micron average size alumina, i.e. in the formulation of Example XIV the 125 gms of silica were replaced by 94 gms of silica and 31 gms of alumina. The slurry was coated at 8.1 lbs/ream. After drying, melamine impregnation and lamination, test results were as follows:

Initial wear: 300 cycles
Final wear: 1150 cycles
Wear value: 725 cycles

Thus, at a lower coating weight compared with Example XIV, improved wear was obtained.

Compared with the prior attempts, the present invention provides vastly improved results such that the present invention can be truly considered to be a revolutionary development in the field of decorative laminates. Insofar as is known, the present invention provides the first time a laminate without an overlay sheet has been made which is capable of meeting both the NEMA Abrasion Resistance Standard of at least 400 cycles, and an initial wear point in this same test of at least 175-200 cycles.

The closest thing previously available (see FIG. 2) has been the use of print paper made in accordance the Lane et al U.S. Pat. No. 3,798,111. While laminates made using this paper, without an overlay, have excellent abrasion values according to the NEMA Standard, the initial wear point in these products, however, is still very poor. Tests conducted on such laminates show that many have initial wear values of under 100 cycles, some as low as 35 cycles, whereas conventional laminates made with conventional overlay have an initial wear point of 175-200 cycles. In contrast, laminates made in accordance with the present invention have initial wear points of no less than 175 cycles (usually a minimum of 200 cycles) and up to about 500 cycles.

There are many uses of laminates in which initial pattern wear rather than NEMA wear value determine the acceptable life of the surface. For example, supermarket check-out counters, food service counters, cafeteria tables, and other commercial surfaces are exposed to abrasive rubbing and sliding of unglazed dinnerware, canned goods, fiberglass trays, etc. If small areas of the pattern begin to disappear after a relatively short period of use, particularly in an irregular pattern, the surface will be unacceptable to the owner and will result in an expensive replacement. If the surface wears gradually and evenly over a long period of time, the wear out time exceeds the normal replacement cycle due to style changes, approximately 3-5 years.

Figure 1:
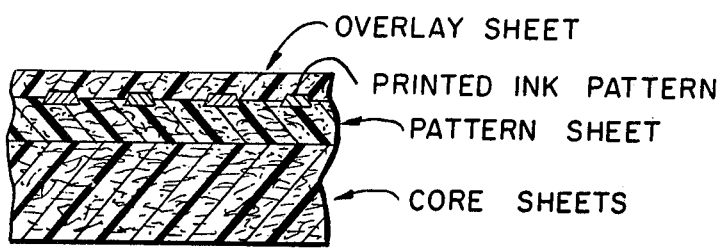
FIGS. 1–3 are schematic sectional views of laminates in accordance with the prior art.

Conventional high pressure laminates (see FIG. 1) with initial wear values of 175-200 are known to be satisfactory in commercial or institutional service, and show perhaps 10-20% pattern loss in 3-5 years on checkout counters. To determine a predicted wear-out time for laminate (FIG. 2) without overlay made using the print paper of the Lane et al U.S. Pat. No. 3,798,111, such laminates along with conventional laminates and those made in accordance with the present invention were subjected to an abrasive rub test consisting of sliding a simulated fiberglass tray surface back-and-forth over the test laminate, the simulated fiberglass tray surface being bonded to the bottom of a No. 10 can carrying 5 lbs. of weight, and flexibly clamped in a cam driven jig that provided about 5 inches of oscillatory motion. In this test, the laminate according to U.S. Pat. No. 3,798,111 began to show pattern destruction after about 3000 rub cycles. Conventional laminate with overlay and laminate prepared in accordance with the present invention without overlay did not show any pattern destruction after 30,000 cycles.

In addition to providing poorer initial wear values, the laminates made without overlay using the print paper of the Lane et al U.S. Pat. No. 3,798,111 provide other disadvantages as well. In the Lane et al patent, the alumina particles are introduced during the paper making process and this results in a special grade paper for each base paper color required, greatly increasing inventory requirements; in contrast, in the present invention in which the coating is applied after printing, use is made of all existing stocks of conventional print paper. Furthermore, the present invention is more flexible than the Lane et al process in that it permits tailoring of the abrasion resistance to specific needs, without the cumbersome redevelopment of a paper base on a paper machine.

As pointed out in Example XIII above, the "rub test" or "sliding can test" was also used to compare the present invention with conventional mirror-surfaced laminates having overlay. As previously noted, both start initial pattern destruction at about 30,000 rub cycles. The conventional laminate shows gradual surface dulling beginning almost with the first few hundred rub cycles, and is completely dulled well before initial pattern destruction. The laminate made with the abrasion-resistant print in accordance with the present invention, however, showed negligible surface dulling almost up to the point of pattern destruction. These results suggest not only an important advantage of the instant invention compared with conventional laminates including overlay, but also similar advantages compared with laminates produced by the casting of the overlay in situ on the print sheet, e.g. the Fuerst U.S. Pat. No. 3,373,071.

Figure 3:
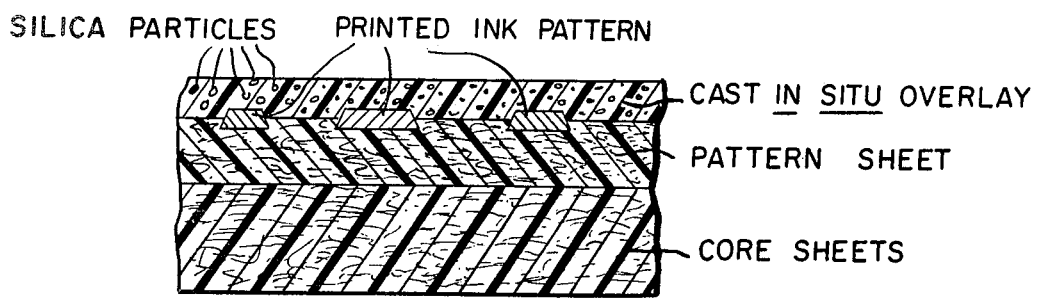

The present invention is also believed to constitute other important improvements over the casting of an overlay sheet (Michl U.S. Pat. No. 3,135,643 and Fuerst U.S. Pat. No. 3,373,071; and other patents). Such patents show the coating of a resin containing layer onto resin impregnated pattern sheet, in which the upper resin layer contains abrasion resistant mineral particles (see FIG. 3). In these techniques, the base paper already contains the melamine resin and the thick coating applied also contains melamine resin. The coating is applied in a thickness of, at the very least, 0.022 lbs. per sq. ft. which is a quantity at least 8 times as great as that used in the present invention. The thickness of the dry layer runs at least 1 mil and preferably more compared with dry coatings in the present invention running from 0.02 to 0.3 mils, preferably maximum of 0.2 mils.

The Michl patent essentially discloses how to deposit an overlay layer onto the impregnated pattern sheet, rather than how to eliminate the overlay. The finished laminate (FIG. 3) is essentially the same as that of a conventional laminate, containing cellulose fibers, resin, and differs only by the mineral particles dispersed in this layer. The Fuerst U.S. Pat. No. 3,373,071 states that the process taught by Michl results in laminates that are blotchy when satinized. A significant percentage of laminates are satinized with pumice and rotating brushes to reduce their surface gloss. The Fuerst patent replaces the cellulose fiber of the Michl process with microcrystalline cellulose in order to provide blotch-free surfaces after satinizing. Thus, the basic process of Fuerst is the same as that of Michl, i.e. depositing a resin containing overlay layer onto the wet, impregnated pattern sheet, the thickness of the Fuerst coating being between 8 and 100 times thicker than those found useful in the present invention, and offering no significant savings of raw material compared with conventional, overlay containing laminate.

It will be obvious to those skilled in the art that various changes may be made without departing from the scope of the invention and the invention is not to be considered limited to what is shown in the drawings and described in the specification. For example, it will be understood that certain additional variations in processing will, in certain instances, give somewhat different results. For example, results are generally better when the laminates in accordance with the present invention are formed against a hard surface. Thus, plate produced finishes, such as mirror and satin, provide better initial wear under given coating conditions than do foil (or other soft-backed pressing surfaces) produced finishes. Accordingly, in some instances it is advantageous to calender the dried, coated pattern sheet prior to impregnation with the thermosetting resin.

The foregoing description of the specific embodiments will so fully reveal the general nature of the invention that others can, by applying current knowledge, readily modify and/or adapt for various applications such specific embodiments without departing from the engineering concept and, therefore, such adaptations and modifications should and are intended to be comprehended within the meaning and range of equivalents of the disclosed embodiments. It is to be understood that the phraseology or terminology employed herein is for the purposes of description and not of limitation.

What is claimed is:

1. A method of producing an abrasion resistant decorative laminate from at least one backing layer and a thermosetting resin impregnated decorative facing sheet, said laminate having enhanced abrasion resistance without an overlay layer, the method comprising:

coating a decorative facing sheet with an ultra-thin wet layer of a mixture of (1) an abrasion resistant hard mineral of particle size 20–50 microns in quantity sufficient to provide an abrasion resistant layer without interfering with visibility and (2) binder material for said mineral which binder material has the properties of withstanding the subsequent laminating conditions, being compatible with said thermosetting resin, said binder being present in an amount sufficient to bind said abrasion resistant mineral to the surface of said decorative facing sheet, and the binder-mineral layer in the dry state being permeable to said thermosetting resin;

drying said coated binder mineral mixture at a temperature sufficient to enhance the bonding of said abrasion resistant material by said binder material to said decorative facing sheet, to provide an ultra-thin dry porous layer of said binder-mineral mixture thereon;

impregnating said coated facing sheet with said thermosetting resin;

assembling said resin impregnated and coated facing sheet over said backing layer; and subjecting said assembly to heat and pressure sufficient to effect consolidation of said backing layer and said facing sheet to thereby provide said abrasion resistant decorative laminate.

2. A method in accordance with claim 1, wherein said binder material is microcrystalline cellulose and said thermosetting resin is melamine-formaldehyde resin, and said drying is carried out at a temperature of at least about 140° F.

3. A method in accordance with claim 2 wherein said abrasion resistant mineral is alumina, silica or a mixture thereof.

4. A method in accordance with claim 3 wherein said binder-mineral mixture comprises 5–10 parts by weight of microcrystalline cellulose for about 20–120 parts by weight of alumina, along with sufficient water to facilitate the coating operation, and wherein said coating is carried out at such a rate as to provide an ultra-thin coating, after drying, of thickness from 0.02 to about 0.3 mils thick.

5. A method in accordance with claim 4 wheren said finder-mineral mixture further comprises about 0.5% to about 2% by weight of an amino silane based on the weight of the alumina.

6. A method in accordance with claim 3 wherein said mixture binder-mineral mixture further contains a small quantity of non-ionic wetting agent.

7. A method in accordance with claim 3 wherein said drying is carried out at a temperature of 240°–270° F.

8. A method in accordance with claim 1 wherein said composition further comprises a silane compatible with said thermosetting resin, said silane being present in an amount sufficient to chemically bond said abrasion resistant mineral to said thermosetting resin.

9. A method of producing an abrasion resistant, high-pressure decorative laminate in accordance with claim 1 wherein said backing comprises a plurality of phenolic resin impregnated kraft paper sheets, and said thermosetting resin comprises melamine-formaldehyde resin, the heat and pressure to which said assembly is subjected to effect consolidation being about 230°–340° F. and 800–1600 p.s.i.

10. A product obtained by the process of claim 9.

11. A method in accordance with claim 9 wherein said binder material comprises predominantly is microcrystalline cellulose and said abrasion resistant mineral is alumina, said mixture comprising about 5–10 parts by weight of said microcrystalline cellulose for about 20–120 parts by weight of said alumina, and wherein said binder-mineral mixture is applied so as to provide a dry, ultrathin layer of about 0.02 to about 0.3 mils thick.

12. A method in accordance with claim 10 wherein said binder-mineral mixture further comprises 0.5 to about 2% by weight, based on the weight of said alumina, of an amino silane.

13. A method of producing an abrasion resistant low-pressure decorative laminate in accordance with claim 1, wherein said thermosetting resin is selected from the group consisting of melamine-formaldehyde resin and polyester resin.

14. A method in accordance with claim 13 wherein said backing layer comprises a wood particle panel, said thermosetting resin is melamine-formaldehyde resin, said laminating is carried out at a temperature of about 325°–350° F. and a pressure of about 175–225 p.s.i., and wherein said abrasion resistant material is alumina, silica or a mixture thereof, and said binder material comprises predominently is microcrystalline cellulose, said microcrystalline cellulose being present in an amount of about 5 to about 10 parts by weight per about about 20–120 parts by weight of said mineral, said mixture being applied to provide a dried coating of 0.02 to 0.2 mils thickness, said drying being carried out at a temperature of at least 180° F.

15. A process in accordance with claim 14 wherein said composition further comprises 0.5–2% by weight of an amino silane based on the weight of said alumina.

16. A product obtained by the process of claim 13.

17. A method in accordance with claim 1 wherein said binder material comprises a mixture of microcrystalline cellulose and carboxymethylcellulose.

* * * * *

UNITED STATES PATENT AND TRADEMARK OFFICE
CERTIFICATE OF CORRECTION

PATENT NO. : 4,255,480
DATED : March 10, 1981
INVENTOR(S) : Herbert I. Scher and Israel S. Ungar It is certified that error appears in the above—identified patent and that said Letters Patent is hereby corrected as shown below:

| | |
|---|---|
| Column 1 Line 4 | "parant" should read "parent" |
| Column 1 Line 56 | "230-240°F" should read "230-340°F" |
| Column 5 Line 10 | Omit the word "not" |
| Column 19 Line 7 | "finder" should read "binder" |

Signed and Sealed this

Twenty-first Day of July 1981

[SEAL]

Attest:

Attesting Officer

GERALD J. MOSSINGHOFF

Commissioner of Patents and Trademarks